United States Patent [19]

Meltsch

[11] Patent Number: 4,656,316
[45] Date of Patent: Apr. 7, 1987

[54] SPLICE PROTECTIVE INSERT FOR CABLE SLEEVES

[75] Inventor: Hans-Juergen Meltsch, Schwerte-Ergste, Fed. Rep. of Germany

[73] Assignee: Siemens Aktiengesellschaft, Berlin and Munich, Fed. Rep. of Germany

[21] Appl. No.: 790,554

[22] Filed: Oct. 23, 1985

[30] Foreign Application Priority Data

Nov. 12, 1984 [DE] Fed. Rep. of Germany ....... 3441311

[51] Int. Cl.4 ........................................... H02G 15/08
[52] U.S. Cl. ....................................... 174/92; 174/93; 174/DIG. 8
[58] Field of Search ...................... 174/92, 93, DIG. 8

[56] References Cited

U.S. PATENT DOCUMENTS

| 3,711,632 | 1/1973 | Ghirardi | 174/92 X |
| 3,823,254 | 7/1974 | Smith | 174/92 |
| 3,879,574 | 4/1975 | Filreis et al. | 174/92 X |
| 4,142,592 | 3/1979 | Brusselmans | 174/92 |
| 4,282,397 | 8/1981 | Siedenburg et al. | 174/92 |
| 4,289,553 | 9/1981 | Nolf | 174/DIG. 8 X |
| 4,380,686 | 4/1983 | Moisson | 174/DIG. 8 X |
| 4,472,222 | 9/1984 | Moisson et al. | 174/92 X |

FOREIGN PATENT DOCUMENTS

| 225770 | 7/1962 | Fed. Rep. of Germany | 174/92 |
| 2304852 | 8/1974 | Fed. Rep. of Germany | 174/92 |
| 3311011 | 9/1984 | Fed. Rep. of Germany | . |
| 113089 | 4/1979 | Japan | 29/869 |
| 984179 | 2/1965 | United Kingdom | 174/92 |
| 1429715 | 3/1976 | United Kingdom | 174/93 |

Primary Examiner—Morris H. Nimmo
Attorney, Agent, or Firm—Jeffrey P. Morris

[57] ABSTRACT

The present invention involves a cable splice protective insert for cable sleeves. The insert should be of shrinkable material comprising a central part of cylindrical halfshells (1, 2) and deformable side parts (3, 4, 5) for diameter reduction at the cable introduction ends of the faces of the cylinder. The side parts (3, 4, 5) are firmly attached to at least one halfshell (1, 2) and have a corrugation running in the longitudinal direction of the insert. Therefore, a diameter reduction can be obtained in simple manner by applying a radial pressure to the corrugated ends.

14 Claims, 13 Drawing Figures

U.S. Patent   Apr. 7, 1987   Sheet 1 of 3   4,656,316
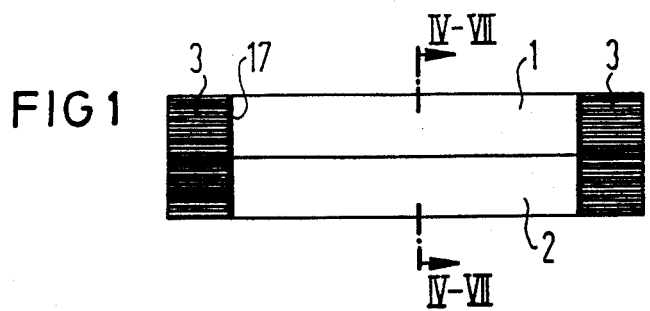
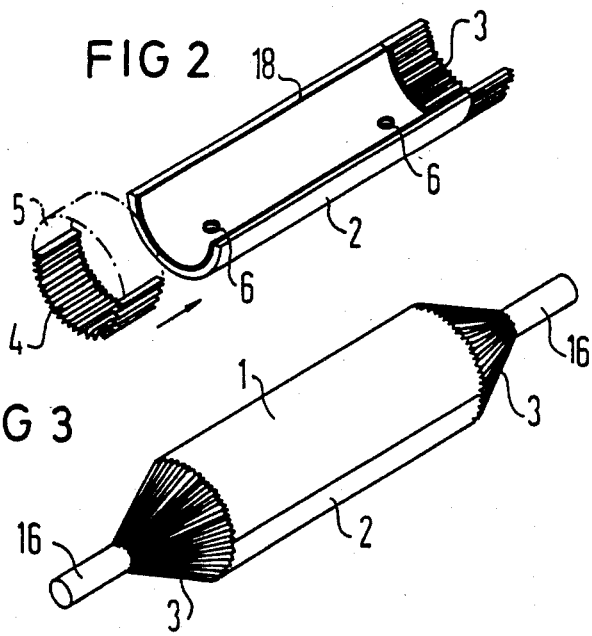
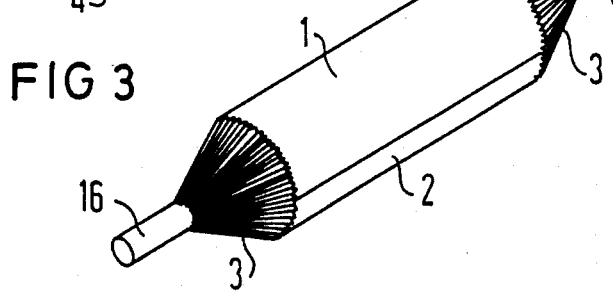
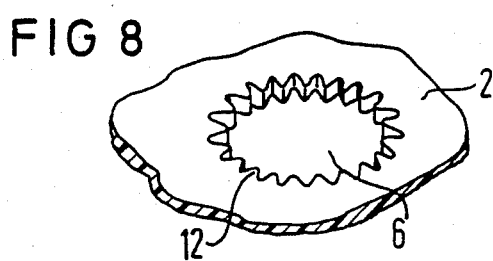

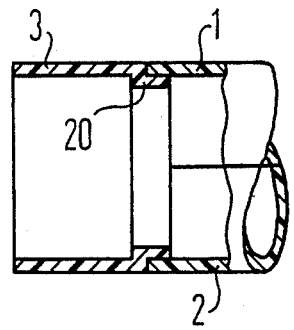
FIG 11
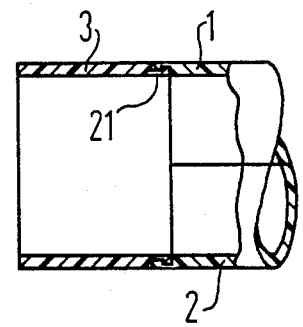
FIG 12
FIG 13
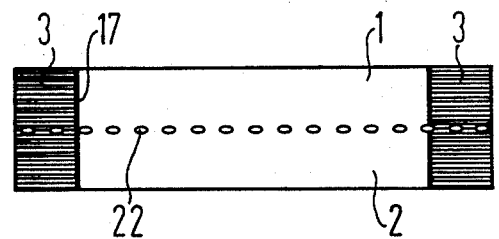

SPLICE PROTECTIVE INSERT FOR CABLE SLEEVES

BACKGROUND OF THE INVENTION

1. Technical Field

The invention relates to the field of protective inserts for cable sleeves and particularly to an insert comprised of shrinkable material having a central part of cylindrical halfshells and deformable side parts for diameter reduction at the cable introduction ends of the cylinder.

2. Description of the Prior Art

A splice protective insert for cable sleeves whose central part consists of cylindrical halfshells and its lateral ends consist of deformable side parts for diameter reduction is known from U.S. Pat. No. 4,142,592. The side parts are of a relatively stiff material and their one end has deformable, mutually spaced tabs which can be bent inwardly in taper fashion to reduce the diameter of the splice protective cover. But the consequence thereof is that the tapering transition does not necessarily provide full permeation protection due to the triangular cutouts in the side parts. The tabs are bent more or less inwardly depending on the diameter of the cable introduced so that corresponding free spaces remain. In addition, a relatively thick material must be used to assure the required stiffness in this area.

Also known from German application No. 33 11 011 is a cable sleeve insert for a shrinkable cable sleeve made of corrugated material over its entire length. This, however, involves a relatively flexible insert because it is wound loosely over the splice. Therefore, it has no great supporting effect itself and by and large rests on the cable splice it surrounds.

SUMMARY OF THE INVENTION

It is an object of the present invention to provide a cable splice protective insert which is of particularly sturdy construction having a cable splice supporting part for supporting a shrinkable cable sleeve to be applied over it and which, in addition, offers complete, closed permeation protection in diameter reduction transition areas where the cables are introduced to the splice at each end. According to the invention, the problem posed is solved by means of a splice insert of the kind described in that side parts for diameter reduction are provided on at least one halfshell and the side parts are corrugated in the longitudinal direction of the insert.

Designing the splice guard insert in accordance with the invention results in advantages over the state of the art with respect to the permeation barrier in the lateral areas in which the diameter matching between the central cylindrical part of the splice guard insert and the diameter of the respectively introduced cable takes place. Such an embodiment promotes stability in the entire splice protective insert cover area.

The corrugation in the splice protective insert side parts permits simple matching between the various diameters because their outer ends merely have to be compressed about the cables. But in so doing, complete permeation protection is assured because, due to the corrugation, the transition area can be formed without longitudinal cutouts. It is of particular advantage here that, through the relatively sturdy halfshells to which the side parts are fastened, an independent support is provided which does not have to be supported by the splice and, in addition, it offers adequate support for the shrinkable cable sleeve to be applied over it. The halfshells are so designed according to the invention that mutual alignment and centering is automatic in assembly, obviating special measures to accomplish this. Moreover, filling or venting holes can be provided in these halfshells so that these splice protective inserts are also applicable, for instance, for filled or even gas pressurized cable systems. The appropriate accessories like plugs, valves or the like can be tightly inserted in these holes. The side parts can be assembled to the central part directly or with the help of additional means like squeezing, detaining or by being bonded, cemented or glued so as to simplify the assembly greatly. A great number of requirements regarding tightness, shielding and the like can be met optimally by the selection of the material of which the splice protective insert is manufactured. For instance, the use of metal or metal foils is possible, as is the use of plastics, e.g. suitable heat resistant plastics such as unsaturated polyester resins, epoxy resins or phenolic resins. Fiberglass reinforcements may be incorporated when needed. It is of further advantage that the central part can be utilized for the cable splice up to its full diameter because it has no wasted volume as for indentions or corrugation, only the side parts are corrugated. Due to the simplicity of design of the splice protective insert, its production is also particularly simple. The halfshells can be produced as individual parts by a simple stamping or pressing operation, or continuously by extrusion. This means that central parts of any desired length can be used. It is also possible to string several shorter central parts together which are then provided with the side parts at the ends after the required length has been reached. Thus, different lengths of splice protective inserts and, hence, of cable sleeve can be produced in simple manner. If metal is used, permeation protection is inherently provided in addition. When using plastics, a permeation barrier, e.g. in the form of an aluminum foil, can additionally be incorporated or applied. Furthermore, adequate permeation protection can also be provided by appropriately metalizing the plastic housing.

BRIEF DESCRIPTION OF THE DRAWINGS

FIG. 1 shows the cable splice protective insert according to the invention in assembled but uninstalled condition;

FIG. 2 shows a halfshell of the splice protective insert;

FIG. 3 shows the splice protective insert according to the invention in an installed condition;

FIG. 8 shows an embodiment comprising a filling or venting hole incorporated in the halfshells;

FIG. 11 shows the attachment of the side-parts to the central part

FIG. 12 shows an alternative attachment of the side-parts to the central part

FIG. 13 shows an embodiment with perforations along the surface line.

DETAILED DESCRIPTION

Figure 4:
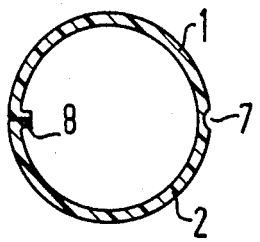
FIG. 4 shows the transverse section of a foldable embodiment.

Now, FIG. 1 shows a cable splice protective insert for a cable sleeve according to the invention consisting of two halfshells 1 and 2 placed on top of each other. The two halfshells 1 and 2, forming the central cylindrical part of the splice protective insert, consist of relatively strong material such as metal, like aluminum, or heat resistant lacquer or plastic. The attached side parts 3, fastened to the halfshells depending upon the embodiment, such as by a bonding layer 17 consist of material corrugated in longitudinal direction, the corrugation being selected so that the outer ends can be compressed by slight radial pressure to reduce the diameter until contact is made with an introduced object such as a cable. In this manner, a continuous transition, closed all around, is created between the diameter of the central part and the smaller diameters of the introduced cables so that, with suitable material selection, permeation protection and complete closure are also provided. The special embodiment examples of the halfshells 1 and 2 are described in greater detail by way of sectional views IV-VII in FIGS. 4 to 7.

FIG. 2 illustrates the design of a halfshell 2 according to the invention which is of stable shape. To one of its lateral ends there is firmly fastened to the halfshell 2, as an example, a corrugated side part 3. It is demonstrated on the second end of the halfshell 2 that a corrugated side part 4 can be attached all around as an extension of the halfshell 2 or as a molded part 5 covering both halfshells 1 and 2. These side parts 3, 4 and 5 are either bonded, cemented or glued on, clamped on or clipped on by appropriate measures. Anyway, it is clearly evident that the side parts 3, 4 or 5 each consist of longitudinally corrugated and preferably permeation-tight material so as to provide the already mentioned closed permeation protection. A permeation layer 18 is provided. Bonding is defined as either bonding, cementing or gluing. It is also shown that the halfshell 2 can be provided with filling or also venting holes 6. In this manner, the splice protective insert can be vented and, if appropriately enveloped, can also be used in filled or gas pressurized systems.

FIG. 3 shows a splice protective insert according to the invention disposed over a splice for introduced cables 16. The two deformable side parts 3 are depressed at their free ends onto the introduced cables 16, thus forming the closed permeation protection also in the transition areas. Over this is applied a suitable envelope such as of shrinkable material.

Now, FIG. 4 shows, in section, a possible embodiment for the halfshells 1 and 2, interconnected here so as to be foldable through a groove 7 formed by material thinning in longitudinal direction. At the two other ends of the halfshells 1 and 2 are, for example, widened bearing surfaces 8 so that adequate contact is assured also in case of a possibly occurring transverse shift. The same effect can be obtained by providing a perforation along the surface line diametrically opposite the longitudinal slot of the two joined halfshells 1 and 2.

Figure 5:
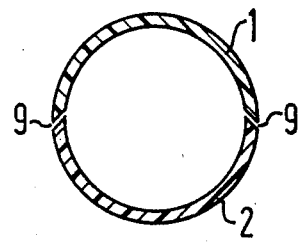
FIG. 5 shows the transverse section of a self-centering embodiment.

FIG. 5 illustrates an embodiment example with separate halfshells 1 and 2 whose longitgudinal edges 9, however, are beveled so that, when joining them, the halfshells 1 and 2 align and center themselves mutually, making the assembly very simple.

Figure 6:
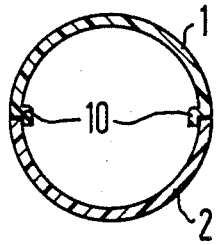
FIG. 6 shows the transverse section of a lockable embodiment.

FIG. 6 shows, in transverse section, another embodiment example of the halfshells 1 and 2. Here, the one halfshell 1 has extensions 10 oriented inwardly, thus projecting into the second halfshell 2 when being joined. This again provides automatic alignment and centering of the two halfshells 1 and 2.

Figure 7:
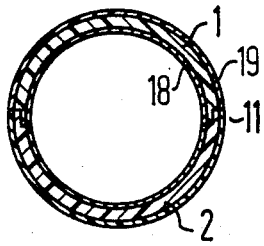
FIG. 7 shows another embodiment with interlocking coordination elements.

Finally, an embodiment example is shown in FIG. 7, the effect of which is similar to the previously described one, except that the extensions 11 here are thinner than the wall thicknesses of the halfshells 1 and 2, respectively, and, furthermore, each halfshell has such extensions oppositely offset. When joining the halfshells 1 and 2, the mutually contacting extensions 11 complement each other to form the full wall thickness. The permeation layer 18 and the outer protective layer 19 on the halfshells 1 and 2 are shown by way of example. The outer protective layer 19 may be a coating of heat resistant lacquer or plastic. This has the advantage that no projecting profiles are present so that the e.g. shrunk-on envelope has a completely smooth outward appearance.

FIG. 8 shows a filling or venting hole 6 which can be provided in the halfshell 1 or also halfshell 2. This hole can either be machined in the factory or it can be provided through cutouts in the material so that it is easy to punch the hole through when needed. Preferably, the rim of such a hole 6 has a serration 12 so that closures to be potentially inserted in the form of plugs can be pushed in elastically, but in clamping fashion.

Figure 9:
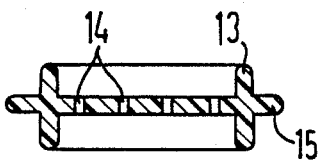
FIG. 9 shows a closure element for the filling or venting hole indicated in FIG. 8.

FIG. 9 shows in cross section a removable plug 13-15 which has an edge 13 projecting outwardly and a detent ring 15. Consequently, the plug 13-15 can be pushed in only up to the detent ring 15 so as to eliminate the danger of pushing it through. In addition, the plug 13-15 has enough profile due to the edge 13 that it, and hence also the hole 6, can be seen from the outside of the insert through the envelope and be cut out when needed. This plug also provides later access for tests or maintainance functions and the like which may have to be conducted.

Figure 10:
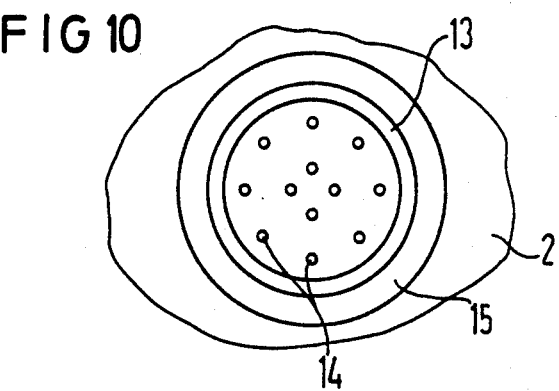
FIG. 10 shows the closure inserted in the filling or venting hole.

Supplementing this, FIG. 10 shows a top view of an inserted venting plug 13-15 with its projecting edge 13, the detent ring 15 and the centering holes 14.

FIG. 11 shows the attachment of the side-parts 3 to the central part consisting of halfshells 1 and 2 by wedging, as an example, whereby an edge 20 wedgingly engages the interior of halfshells 1 and 2.

FIG. 12 shows another example of the attachment of the side-parts 3 to the central part at the halfshells 1 and 2 by locking elements 21 which are hooked at the interior.

FIG. 13 shows the embodiment according to FIG. 1 in which perforations 22 are provided along a surface line of the two halfshells 1 and 2.

I claim:

1. A cable splice protective insert for cable sleeves of shrinkable material comprising:

A central portion having first and second cylindrical halfshells of rigid supportive material including elements for joining said halfshells;

deformable side-part means for diametric reduction bonded to at least one of said halfshells at the cable introduction ends of the open faces of said cylindrical halfshells; such that said side-part means disposed on said halfshell includes a corrugation in the longitudinal direction of said cable splice protective insert; and permeation barrier means along the length of said halfshells.

2. A cable splice protective insert according to claim 1, wherein the joining elements are comprised of material, thinned to a groove along one edge such that the halfshells are permanently attached to each other but are foldable from an open to a closed position.

3. A cable splice protective insert according to claim 1, wherein the joining elements are so designed along at least one edge of each halfshell as to make the halfshells centerable, one on the other.

4. A cable splice protective insert according to claim 1, wherein said joining elements of the halfshells comprise guides for engaging each other.

5. A cable splice protective insert according to claim 4, wherein the halfshells include filling or venting holes.

6. A cable splice protective insert according to claim 1, wherein the halfshells consist of metal, preferably of aluminum.

7. A cable splice protective insert according to claim 1, wherein the halfshells are coated with an insulating material such as a heat resistant lacquer or plastic.

8. A cable splice protective insert according to claim 1, wherein the halfshells consist of a heat resistant plastic.

9. A cable splice protective insert according to claim 8, wherein said heat-resistant plastic is an unsaturated polyester resin.

10. A cable splice protective insert according to claim 8, wherein said heat-resistant plastic is a phenolic resin.

11. A cable splice protective insert according to claim 1, wherein said side-part means are firmly attached to a halfshell.

12. A cable splice protector insert according to claim 1, wherein said side-part means are semicylindrical and are disposed at the ends of each halfshell.

13. A cable splice protective insert according to claim 1, wherein said joining element is designed as a perforation running along a surface line of the joined halfshells.

14. A cable splice protective insert according to claim 1, wherein said permeation barrier is comprised of aluminum foil.

* * * * *